United States Patent
Yang et al.

(10) Patent No.: US 12,206,815 B2
(45) Date of Patent: *Jan. 21, 2025

(54) SUPPORT FOR ENVELOPE REPORTING

(71) Applicant: Telefonaktiebolaget LM Ericsson (publ), Stockholm (SE)

(72) Inventors: Yong Yang, Kållered (SE); Ioannis Sapountzis, Mölndal (SE); Jiehong Yang, Mölndal (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/690,286

(22) Filed: Mar. 9, 2022

(65) Prior Publication Data
US 2022/0272202 A1    Aug. 25, 2022

Related U.S. Application Data

(63) Continuation of application No. 16/635,802, filed as application No. PCT/EP2017/069384 on Aug. 1, 2017, now Pat. No. 11,277,523.

(51) Int. Cl.
*H04M 15/00* (2024.01)
*H04W 4/24* (2018.01)

(52) U.S. Cl.
CPC ........... *H04M 15/66* (2013.01); *H04M 15/64* (2013.01); *H04M 15/65* (2013.01);
(Continued)

(58) Field of Classification Search
CPC ...... H04M 15/66; H04M 15/64; H04M 15/65; H04M 15/8207; H04M 15/85; H04W 4/24
(Continued)

(56) References Cited

U.S. PATENT DOCUMENTS 9,479,917 B1 * 10/2016 Gota ................. H04M 15/8228
9,699,324 B1 *  7/2017 Rashid .................... H04W 4/24
(Continued)

FOREIGN PATENT DOCUMENTS

CN    101785339 A      7/2010
CN    102083035 A *    6/2011    ......... H04L 12/1407
(Continued)

OTHER PUBLICATIONS

3GPP TS 32.240, Charging management; Charging architecture and principles, version 15.2.0 Release 15, 61 pages (Year: 2018).*
International Search Report and Written Opinion issued in International Application No. PCT/EP2017/069384 dated Apr. 3, 2018 (15 pages).
(Continued)

*Primary Examiner* — Mong-Thuy T Tran
(74) *Attorney, Agent, or Firm* — Rothwell, Figg, Ernst & Manbeck, P.C.

(57) ABSTRACT

A method performed in a CP node. The method comprises setting a TQM in a URR to which its corresponding SDFs are applicable for envelope reporting, setting at least one reporting trigger in the URR, to instruct the UP function to generate a usage report upon closure of an envelope, setting a measurement method in the URR, to instruct the UP function to collect usage of volume, time and/or event, sending the set URR to the UP function, receiving one or more usage reports from the UP function, in response to the sent URR, wherein the received usage report(s) comprises at least a usage report trigger set to envelope closure, determining a starting time and/or an ending time for each envelope, based on the received usage report(s), and storing each envelope, with the determined starting time and/or ending time, for online or offline charging.

25 Claims, 6 Drawing Sheets

(52) U.S. Cl.
CPC ....... *H04M 15/8207* (2013.01); *H04M 15/85* (2013.01); *H04W 4/24* (2013.01)

(58) Field of Classification Search
USPC .......................................................... 455/406
See application file for complete search history.

(56) References Cited

U.S. PATENT DOCUMENTS

| | | | |
|---|---|---|---|
| 10,057,775 B2* | 8/2018 | Raleigh | H04M 15/64 |
| 10,116,457 B1 | 10/2018 | Juneja | |
| 10,123,225 B1* | 11/2018 | Jain | H04L 43/067 |
| 10,200,543 B2 | 2/2019 | Senarath | |
| 10,237,709 B2* | 3/2019 | Cai | H04M 15/66 |
| 10,511,494 B2 | 12/2019 | Wan | |
| 11,277,523 B2* | 3/2022 | Yang | H04M 15/8207 |
| 2015/0105045 A1 | 4/2015 | Rolfe | |
| 2016/0164691 A1 | 6/2016 | Wang | |
| 2016/0164752 A1* | 6/2016 | Larsson | H04L 12/1467 455/408 |
| 2016/0174055 A1 | 6/2016 | Wang | |
| 2016/0183133 A1 | 6/2016 | Fan | |
| 2019/0182385 A1* | 6/2019 | Yan | H04M 15/65 |
| 2019/0215403 A1* | 7/2019 | Chai | H04L 12/14 |
| 2020/0274973 A1* | 8/2020 | Yan | H04M 15/62 |

FOREIGN PATENT DOCUMENTS

| | | | | |
|---|---|---|---|---|
| CN | 105103591 A | | 11/2015 | |
| EP | 3890240 B1 * | | 11/2022 | H04L 12/14 |

OTHER PUBLICATIONS

3GPP TS 29.244 V14.0.0 (Jun. 2017), 3rd Generation Partnership Project; Technical Specification Group Core Network and Terminals; Interface between the Control Plane and the User Plane of EPC Nodes; Stage 3 (Release 14) Jun. 2017, (137 pages).

3GPP TS 32.299 V14.0.0 (Jun. 2016), 3rd Generation Partnership Project; Technical Specification Group Services and System Aspects; Telecommunication management; Charging management; Diameter charging applications (Release 14) Jun. 2016, (189 pages).

3GPP TS 23.214 V14.2.0 (Mar. 2017), 3rd Generation Partnership Project; Technical Specification Group Services and System Aspects; Architecture enhancements for control and user plane separation of EPC nodes; Stage 2 (Release 14) Mar. 2017, (78 pages).

ETSI TS 132 299 V14.3.0 (Apr. 2017) Digital cellular telecommunications system (Phase 2+) (GSM); Universal Mobile Telecommunications System (UMTS); LTE; Telecommunication management; Charging management; Diameter charging applications (3GPP TS 32.299 version 14.3.0 Release 14) Apr. 2017 (202 pages).

ETSI TS 129 244 V14.1.0 (Oct. 2017) LTE; Interface between the Control plane Plane and the User Plane of EPC Nodes (3GPP TS 29.244 version 14.1.0 Release 14) Oct. 2017 (156 pages).

3GPP TS 29.244 V1.1.0 (Apr. 2017) 3rd Generation Partnership Project;Technical Specification Group Core Network and Terminals; Interface between the Control Plane and the User Plane of EPC Nodes; Stage 3 (Release 14) (123 pages).

3GPP TS 32.299 V14.4.0 (Jun. 2017) (198 pages).

Huawei, 3GPP TSG CT4 Meeting #75bis, Spokane, US; Jan. 16-20, 2017, C4-170130 (15 pages).

* cited by examiner

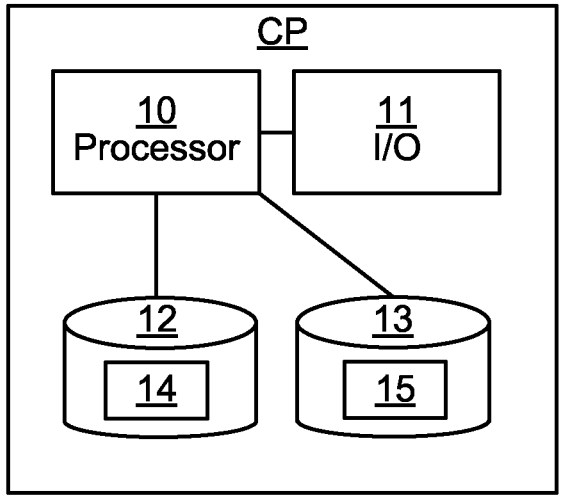
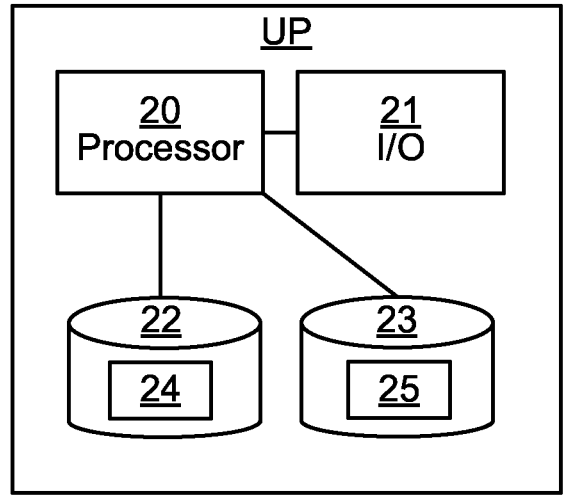
Fig. 7                              Fig. 8
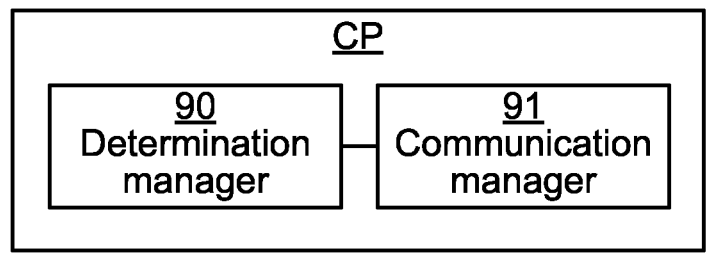
Fig. 9
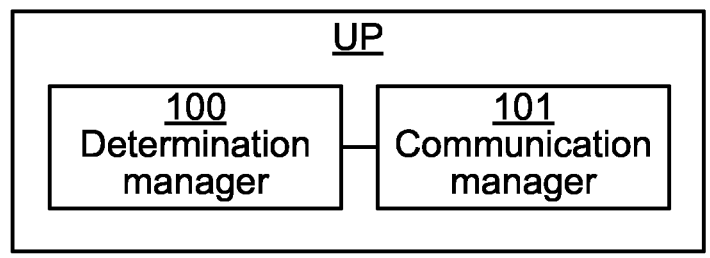
Fig. 10

SUPPORT FOR ENVELOPE REPORTING

CROSS-REFERENCE TO RELATED APPLICATIONS

This application is a continuation of U.S. application Ser. No. 16/635,802, filed on Jan. 31, 2020 (now U.S. Pat. No. 11,277,523, issued Mar. 15, 2022), which is the 35 U.S.C. § 371 National Stage of International Patent Application No. PCT/EP2017/069384, filed Aug. 1, 2017. The above identified applications are incorporated by this reference.

TECHNICAL FIELD

The invention relates to methods for supporting envelope reporting in a radio communication network, control plane nodes for supporting envelope reporting in a radio communication network, user plane nodes for supporting envelope reporting in a radio communication network, corresponding computer programs, and corresponding computer program products.

BACKGROUND

The requirements on the Envelope Reporting in 3rd Generation Partnership Project (3GPP), technical specification (TS) 32.299 are presented hereafter.
6.5.6 Envelope Reporting
The online charging function (OCF) may determine the need for additional detailed reports identifying start time and end times of specific activity in addition to the standard quota management provided in request for change (RFC) 4006 [402]. The OCF controls this by sending a credit control answer (CCA) with Envelope-Report attribute-value pair (AVP) with appropriate values. The charging trigger function (CTF), on receiving the command, monitors for traffic for a period of time controlled by the Quota-Consumption-Time AVP and report each period as a single envelope for each Quota-Consumption-Time expiry where there was traffic. The OCF may request envelope reports for just time, time and volume, time and number of events, or time and volume and number of events.
6.5.7 Combinational Quota
The Quota-Consumption-Time mechanism, described in clause 6.5.4, may be extended (and replaced) when granting time based quota to provide potentially more efficient use of the online charging interface, i.e. reduced traffic and the algorithms in the OCF are potentially simpler. The alternative handling mechanisms that are defined in this clause are:
1) Continuous Time Period (CTP) and 2) Discrete Time Period (DTP).
Both DTP and CTP define time-envelopes in their own manner. The method of forming a time-envelope is controlled by the Time-Quota-Mechanism AVP, which selects the algorithm and the length of the base time interval.
The base time interval, specified by the Base-Time-Interval AVP, is a basic unit for consuming quota. Quota is deemed to be consumed at the start of each base time interval. The CTF shall allow traffic to pass for the duration of the base time interval.
For DTP, the base time interval defines the length of the discrete time period. A time envelope corresponds to exactly one DTP (and therefore to one base time interval). Quota consumption resumes only on the first traffic following the expiry of the DTP (or the closure of the envelope).
For CTP, the mechanism constructs a time-envelope out of consecutive base time intervals in which traffic has occurred up to and including the first base time interval which contains no traffic. Therefore quota consumption continues within the time envelope, if there was traffic in the previous base time interval. After an envelope has closed, then the quota consumption resumes only on the first traffic following the closure of the envelope. The envelope for CTP includes the last base time interval, i.e. the one which contained no traffic. The end of an envelope can only be determined looking back.

If the CTF receives a Multiple-Services-Credit-Control AVP with both the Quota-Consumption-Time AVP and Time-Quota-Mechanism AVP, then the Time-Quota-Mechanism AVP takes precedence and the CTF shall behave accordingly.

If the server requires details of when the DTPs and CTPs occurred then it shall request the reporting of the corresponding time envelopes, by including the Envelope-Reporting AVP when granting quota in the CCA (INITIAL) to indicate whether the client shall report the start and end of each time envelope, in those cases in which quota is consumed in envelopes. The CTF generates envelopes according to the rules described above and carry each envelope in a separate instance of the Envelope AVP in the credit control request (CCR).

Assuming that this is addressed in the following way:

For a control plane (CP) function, it is required to add Time-Quota-Measurement (TQM) and Envelope-reporting provisioning towards the user plane (UP) function:

A TQM, to provide CTP or DTP to the UP function:

For CTP, the time measurement starts from the time that traffic has occurred up to the first time interval which contains no traffic. The time measurement should include the last base time interval, i.e. the one which contained no traffic. The time measurement resumes by the UP function when subsequent traffic is received.

For DTP, the time measurement shall be resumed on the first traffic following the expiry of the DTP.

An Envelope Reporting, to request the UP function to monitor for traffic for a period of time controlled by the Inactivity Detection Time or by the Base Time Interval included in the TQM. The CP function may indicate the UP function to report for just time, time and volume, time and events, or time and volume and number of events.

The CP function may request the UP function to report envelops with the following criteria: If Inactivity Detection Time is included, the UP function should each period of Inactivity Detection Time report a single envelope for each Inactivity Detection Time expiry where there was traffic. For CTP a time envelope includes consecutive base time intervals in which traffic has occurred up to and including the first based time interval which contains no traffic. For DTP, the time envelope corresponds to exactly one base time interval.

Some details are also specified for information elements (IEs) that are used between CP function and UP function, for provisioning and reporting:
8.2.x2 Envelope Reporting
The Envelope Reporting shall be encoded as shown in FIG. 8.2.x2-1, which is used to indicate to the UP function what needs to be reported in the envelope by the UP function.

FIG. 8.2.x2-1: Envelope Reporting

| Octets | Bits 8 7 6 5 4 3 2 1 |
|---|---|
| 1 to 2 | Type = bb (decimal) |
| 3 to 4 | Length = n |
| 5 | Spare      Envelope reporting value |
| 6 to (n + 4) | These octet(s) is/are present only if explicitly specified |

The octet 5 shall be encoded as follows: Bits 1 to 4 indicate which quota should be reported, as specified in Table 8.2.x2-2; Bits 5 to 8-Spare, for future use and set to zero.

TABLE 8.2.x2-2

Envelope reporting value

| Quota Type to be reported | Value (Decimal) |
|---|---|
| Do not report envelopes | 0 |
| Report envelopes | 1 |
| Report envelopes with volume | 2 |
| Report envelopes with events | 3 |
| Report envelopes with volume and events | 4 |
| Spare, for future use. | 5 to 15 |

8.2.x3 Time Quota Mechanism

The TQM type shall be encoded as shown in FIG. 8.2.x3-1.

FIG. 8.2.x3-1
Time Quota Mechanism

| Base Time Interval Type | Value (Decimal) |
|---|---|
| CTP | 0 |
| DTP | 1 |
| Spare, for future use. | 2 to 3 |

The Base Time Interval, shall be encoded as Unsigned32 as specified in subclause 7.2.29 of 3GPP TS 32.299.

Architecture references from 3GPP TS 23.214 is from 4.2.1 Non-roaming and roaming architectures.

This clause defines the complementary aspects of the architecture reference models specified in TS 23.401 clause 4.2 and TS 23.402 clauses 4.2.2 and 4.2.3 for General Packet Radio Service (GPRS) tunnelling protocol (GTP)-based interfaces when serving gateway (SGW), packet gateway (PGW) and traffic detection function (TDF) CP functions and UP functions are separated.

For S2a, S2b, S5 and S8 reference points, this architecture reference model is only supported with GTP-based interfaces. Proxy Mobile IPV6 (PMIP)-based interfaces and S2c interface are not supported.

FIG. 1 shows the architecture reference model in the case of separation between CP and UP. This architecture reference model covers non-roaming as well as home routed and local breakout roaming scenarios.

The -C or -U suffix appended to S2a, S2b, S5 and S8 existing reference points only indicate the CP and UP components of those interfaces.

The architecture in FIG. 1 only depicts the case when the CP and UP functions of all SGW, PGW and TDF nodes are split. However, the other cases when the CP and UP function of only one of these nodes is split while the CP and UP function of the other interfacing node is not split, e.g. PGW's control plane and user plane is split while SGW's control plane and user plane is not split, are also supported. The split architecture of a node does not put any architectural requirements on the peer nodes with which it interfaces. TDF is an optional functional entity.

For a roaming architecture with local breakout, the Gx interface is defined between the PGW-C and Policy and Charging Rules Function (PCRF) in the visited network.

An architecture reference, from 3GPP TS 23.21 is 4.2.2 Combined SGW/PGW architecture.

The usage of a combined SGW/PGW documented in TS 23.401 remains possible in a deployment with separated CP and UP. This is enabled by supporting an Sx interface with a common parameter structure for non-combined and combined cases. FIG. 2 shows the architecture reference model for a combined SGW/PGW in the case of separation between CP and UP.

As an example, a PGW-U may be required to perform counting packets and applying quality of service (QOS) enforcement per Service Data Flow (SDF), per bearer (aggregation of all SDF associated with a bearer) and/or per Session (aggregation of all SDF associated with a Packet Data Network (PDN) connection).

SUMMARY

An object of the invention is to provide an efficient mechanism supporting envelope reporting with a user plane (UP) function separate from a control plane (CP) function, keeping the UP function 3GPP agnostic.

According to a first aspect, there is presented a method for supporting envelope reporting in a radio communication network having a CP function separated from a UP function. The method is performed in a CP node of the radio communication network and comprises setting a time quota mechanism (TQM) in a usage reporting rule (URR), to which its corresponding service data flows (SDFs) are applicable for envelope reporting, setting at least one reporting trigger in the URR, to instruct the UP function to generate a usage report upon closure of an envelope, setting a measurement method in the URR, to instruct the UP function to collect usage of volume, time and/or event, sending the set URR to the UP function, receiving one or more usage reports from the UP function, in response to the sent URR, wherein the received usage report(s) comprises at least a usage report trigger set to envelope closure, determining a starting time and/or an ending time for each envelope, based on the received usage report(s), and storing each envelope, with the determined starting time and/or ending time, for online or offline charging.

By containing complicated envelope mechanisms to the CP function, it is possible to avoid sending unnecessary information regarding envelope mechanisms to the UP, thereby keeping it 3GPP agnostic.

The TQM may comprise a base time interval (BTI) and a BTI type being either continuous time period (CTP) or discrete time period (DTP).

The method may further comprise setting an inactivity detection timer, IDT, in the URR, to a quota consumption time (QCT) received from an online charging system (OCS).

The at least one reporting trigger may be set to envelope closure for CTP and/or DTP.

The determining of the envelope starting time may be based on a time of the first packet in each usage report after a received usage report with the usage report trigger being set to envelope closure.

The determining of the envelope ending time may be based on a time when a received usage report with the user report trigger set to envelope closure has been generated.

According to a second aspect, there is presented a method for supporting envelope reporting in a radio communication network having a CP function separated from a UP function. The method is performed in a UP node of the radio communication network and comprises receiving a usage reporting rule, URR, from the CP function, the URR comprising a TQM and at least one reporting trigger set to envelope closure, and sending a usage report to the CP function, indicating the closure of an envelope.

The TQM may comprise a BTI, and a BTI type being either CTP or DTP. The received URR may comprise a measurement method and an IDT and the BTI type being CTP, and wherein the usage report comprises measurement of time, volume and/or event as instructed in the received measurement method, for a period of time containing consecutive BTIs until the IDT has expired or when detecting no usage for a BTI. The received URR may comprise a measurement method and the BTI type being DTP, and wherein the usage report comprises measurement of time, volume and/or event as instructed by the received measurement method, for each BTI.

The usage report may comprise a usage report trigger set to envelope closure.

According to a third aspect, there is presented a CP node for supporting envelope reporting in a radio communication network having a CP function separated from a UP function. The CP node comprises a processor, and a computer program product storing instructions that, when executed by the processor, causes the CP node to set a TQM in a URR, to which its corresponding SDFs are applicable for envelope reporting, set at least one reporting trigger in the URR, to instruct the UP function to generate a usage report upon closure of an envelope, set a measurement method in the URR, to instruct the UP function to collect usage of volume, time and/or event, send the set URR to the UP function, receive one or more usage reports from the UP function, in response to the sent URR, wherein the received usage report(s) comprises at least a usage report trigger set to envelope closure, determine a starting time and/or an ending time for each envelope, based on the received usage report(s), and to store each envelope, with the determined starting time and/or ending time, for online or offline charging.

The TQM may comprise a BTI and a BTI type being either CTP or DTP.

The CP node may further be caused to set an inactivity detection timer, IDT, in the URR, to a QCT received from an OCS.

The at least one reporting trigger may be set to envelope closure for CTP and/or DTP.

The determining of the envelope starting time may be based on a time of the first packet in each usage report after a received usage report with the usage report trigger being set to envelope closure.

The determining of the envelope ending time may be based on a time when a received usage report with the user report trigger set to envelope closure has been generated.

According to a fourth aspect, there is presented a UP node for supporting envelope reporting in a radio communication network having a CP function separated from a UP function. The UP node comprises a processor, and a computer program product storing instructions that, when executed by the processor, causes the UP node to receive a URR from the CP function, the URR comprising a TQM and at least one reporting trigger set to envelope closure, and to send a usage report to the CP function, indicating the closure of an envelope.

The TQM may comprise a BTI and a BTI type being either CTP or DTP.

The received URR may comprise a measurement method and an IDT and the BTI type being CTP, and wherein the usage report comprises measurement of time, volume and/or event as instructed in the received measurement method, for a period of time containing consecutive BTIs until the IDT has expired or when detecting no usage for a BTI.

The received URR may comprise a measurement method and the BTI type being DTP, and wherein the usage report comprises measurement of time, volume and/or event as instructed by the received measurement method, for each BTI.

The usage report may comprise a usage report trigger set to envelope closure.

According to a fifth aspect, there is presented a CP node for supporting envelope reporting in a radio communication network having a CP function separated from a UP function. The CP node comprises a communication manager for setting a TQM in a URR, to which its corresponding SDFs are applicable for envelope reporting, setting at least one reporting trigger in the URR, to instruct the UP function to generate a usage report upon closure of an envelope, setting a measurement method in the URR, to instruct the UP function to collect usage of volume, time and/or event, sending the set URR to the UP function, for receiving one or more usage reports from the UP function, in response to the sent URR, wherein the received usage report(s) comprises at least a usage report trigger set to envelope closure, and for storing (S140) each envelope, with the determined starting time and/or ending time, for online or offline charging, and a determination manager for determining a starting time and/or an ending time for each envelope, based on the received usage report(s).

According to a sixth aspect, there is presented a UP node for supporting envelope reporting in a radio communication network having a CP function separated from a UP function. The UP node comprises a communication manager for receiving a URR from the CP function, the URR comprising a TQM and at least one reporting trigger set to envelope closure, and for sending a usage report to the CP function, indicating the closure of an envelope.

According to a seventh aspect, there is presented a computer program for supporting envelope reporting in a radio communication network having a CP function separated from a UP function. The computer program comprises computer program code which, when run on a CP node, causes the CP node to set a TQM in a URR to which its corresponding SDFs are applicable for envelope reporting, set at least one reporting trigger in the URR, to instruct the UP function to generate a usage report upon closure of an envelope, set a measurement method in the URR, to instruct the UP function to collect usage of volume, time and/or event, send the set URR to the UP function, receive one or more usage reports from the UP function, in response to the sent URR, wherein the received usage report(s) comprises at least a usage report trigger set to envelope closure, determine a starting time and/or an ending time for each envelope, based on the received usage report(s), and store) each envelope, with the determined starting time and/or ending time, for online or offline charging.

According to an eighth aspect, there is presented a computer program for supporting envelope reporting in a radio communication network having a CP function separated from a UP function. The computer program comprising computer program code which, when run on a UP node, causes the UP node to receive a URR from the CP function, the URR comprising a TQM and at least one reporting trigger set to envelope closure, and send a usage report to the CP function, indicating the closure of an envelope.

A computer program product comprising a computer program and a computer readable storage means on which the computer program is stored, is also presented.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 7 is a schematic diagram illustrating some components of a control plane presented herein;

FIG. 8 is a schematic diagram illustrating some components of a user plane presented herein;

FIG. 9 is a schematic diagram showing functional modules of a control plane presented herein; and FIG. 10 is a schematic diagram showing functional modules of a user plane presented herein.

DETAILED DESCRIPTION

Figure 1:
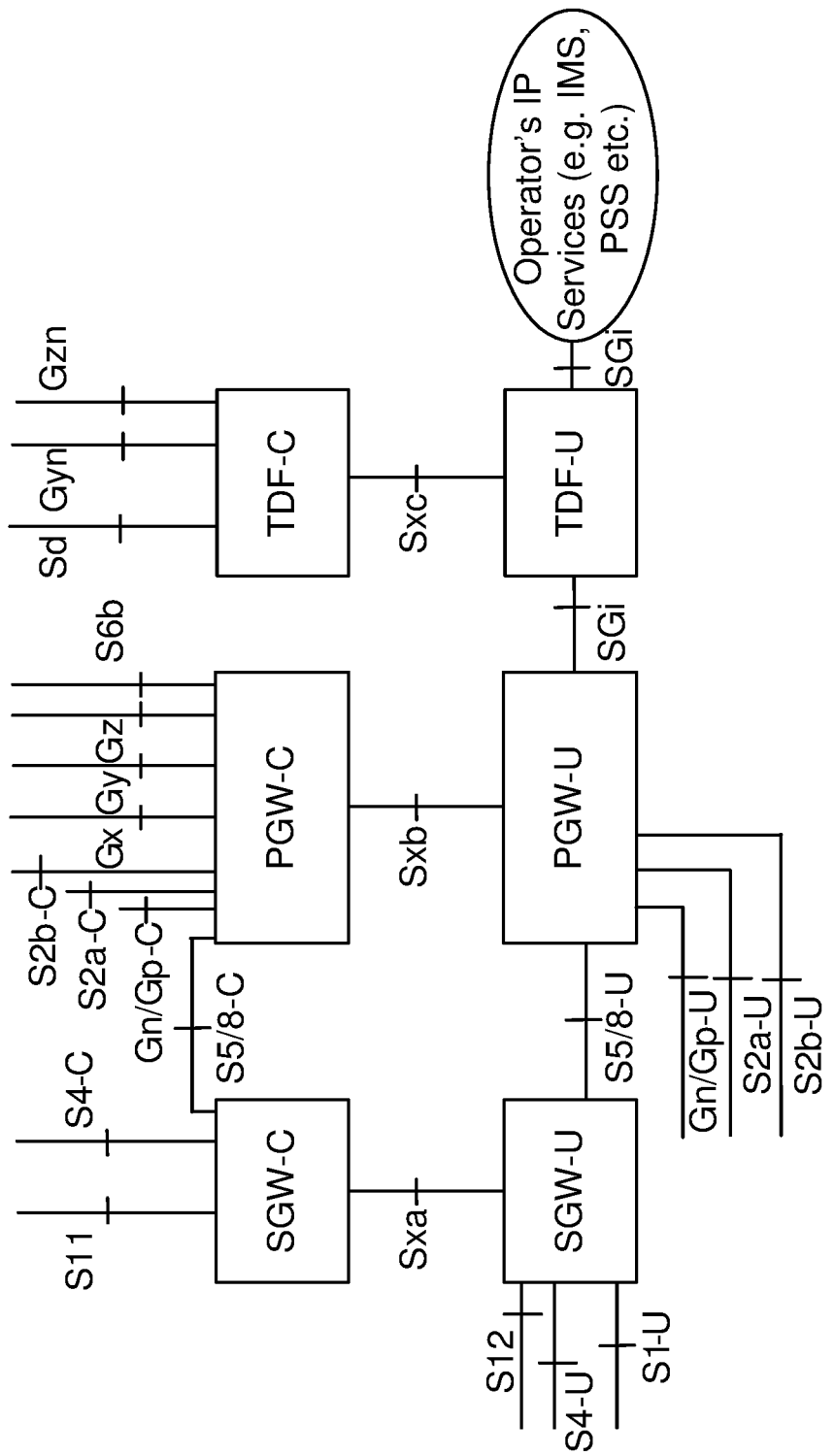
FIG. 1 schematically illustrates an architecture reference model in the case of separation between control plane and user plane.
Figure 2:
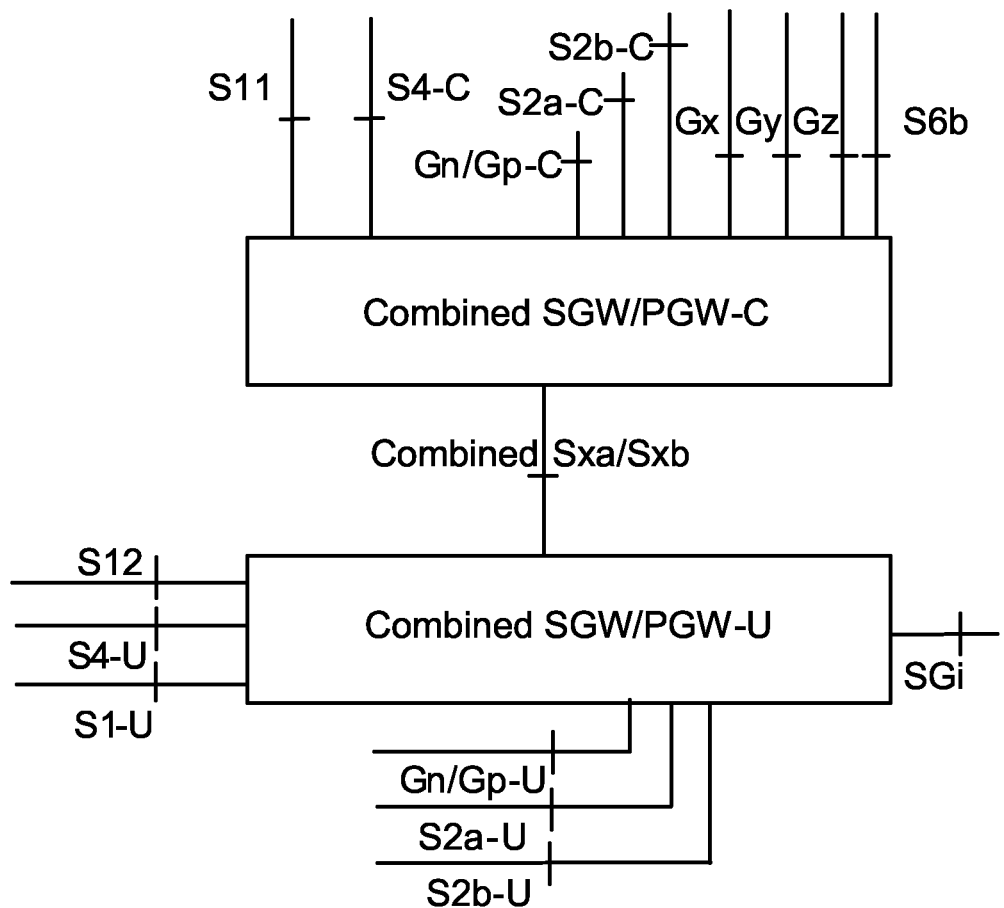
FIG. 2 schematically illustrates an architecture reference model for a combined SGW/PGW in the case of separation between control plane and user plane.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The Sub clause 6.5.6 of 3GPP TS 32.299 specifies an Envelope measurement and reporting mechanism to provide additional detailed report such as corresponding Volume usage to extend the time-based charging usage reporting. The Envelope reporting is only for instructing how the time-based usage shall be reported, however it does reporting in different ways depending on what measurement method is used, that is CTP or DTP. Envelope reporting is independent of quota management (i.e. there is no interaction).

According to the TS, the measurement and Envelope reporting method can be enabled by local configuration or dictated by online charging system (OCS), corresponding to the OCF described in the TS.

There is however no mechanism specified how to support separation of the control plane (CP) function and the user plane (UP) function.

There is a major problem with the assumed solution presented in the background, which push the complexity of both time based measurement mechanism and envelope reporting mechanism to the UP function unnecessarily, which is against the principle of separation of the CP function and the UP function, i.e. to make the UP function 3GPP agnostic.

Some other drawbacks with that assumed solution:
(1) It doesn't explain the connection between continuous time period (CTP) and Inactivity Detection Timer (IDT), which may be mapped to Quota Consumption Time (QCT).
(2) It adds even more parameters for usage within envelope for the usage reporting from the UP function to the CP function, which is not signalling efficient.

A mechanism to support Envelope Reporting under the context of the separation of the CP function and the UP function is presented.

The mechanism includes the following aspects for the CP function:

When envelope reporting is required, the CP function provides a TQM, including a Base Time Interval (BTI) Type, which may be either CTP or DTP, and a BTI to the UP function, for the time based measurement in addition in a Usage Reporting Rule (URR). (This corresponds to subclause 6.5.7 in 3GPP TS 32.299: For CTP the time measurement starts from the time that traffic has occurred up to the first time interval which contains no traffic. The time measurement should include the last base time interval, i.e. the one which contained no traffic. The time measurement resumes by the UP function when subsequent traffic is received. For DTP the time measurement shall be resumed on the first traffic following the expiry of the DTP.)

When envelope reporting is required with the BTI type in the TQM is set to CTP, the CP function requests the UP function to report the traffic for a period of time until the IDT is expired or if no usage (traffic) is detected for the first BTI.

When envelope reporting is required with the BTI type in the TQM is set to DTP, the CP function requests the UP function to report the traffic for each of the BTIs.

The CP function may indicate the UP function to report for just time, time and volume, time and events, or time and volume and number of events by setting Measurement Method accordingly. The CP function sets a reporting trigger to either envelope closure for CTP, or envelope closure for DTP, in the Reporting Triggers information element (IE).

Correspondingly for the UP function:

When the reporting trigger is set to envelope closure for CTP in the corresponding URR, and IDT is included and the BTI type in the TQM is set to CTP, the UP function sends a report for the measurement on the time, and/or volume, and/or events, as instructed in the Measurement Method, for a period time which may contain a number of consecutive BTIs until the IDT is expired, or when no usage/traffic first is detected for a BTI.

When the reporting trigger is set to envelope closure for DTP, in the corresponding URR and the BTI type in the TQM is set to DTP, the UP function sends a report for the measurement on the time, and/or volume, and/or events, as instructed in the Measurement Method, for each BTI.

In other words, the mechanism for supporting envelope reporting in a radio communication system, wherein the UP function is separate from the CP function, comprises the following aspects.

1) Mapping, in the CP function, parameters for TQM which may be received over Gy interface for online charging or configured for offline charging, to the IEs used over the Sx interface.

2) Providing the TQM and possible IDT that is related to Envelope reporting to the UP by specifying the details of whether CTP or DTP is used.

3) Based on the used envelope reporting quota-types (volume together with time, or synchronisation supply unit (SSU) with time, etc) provides proper quota types (by setting such as volume quota/threshold, time quota/threshold in request towards UP, and so on so forth).

4) Existing quota related parameters (such as volume quota, time quota, IDT, etc) are used to instruct the UP function about what to measure.

5) The logic of Envelope reporting is hosted by the CP function, i.e. not providing any reporting related parameter such as quota types to be reported to UP, and hence the CP function creates envelope reports based on usage reports from the UP function to anticipate the requirement of envelope reporting and simply seal the envelope with the proper content.

The UP function will then only need to perform measurements based on methods provided by the CP function, such as CTP or DTP.

However, in addition, a reporting trigger is added by the UP function to indicate that the usage report is triggered by envelope closure.

Two scenarios for CTP and DTP envelope reporting, respectably, will now be exemplified in more detail.

In the DPT example, each complete envelope is reported from UP function to CP function in one usage report, and in the CTP example an envelope report may be split into more than one usage report from UP function to CP function when there is other reporting triggers (charging events, which in this example is volume exhausted) that happens before the closure of the envelope.

However, also the DPT scenario, the CP function may receive an envelope being reported via a few usage reports from the UP function when other reporting triggers take place before the envelope closure reporting trigger.

Figure 3:
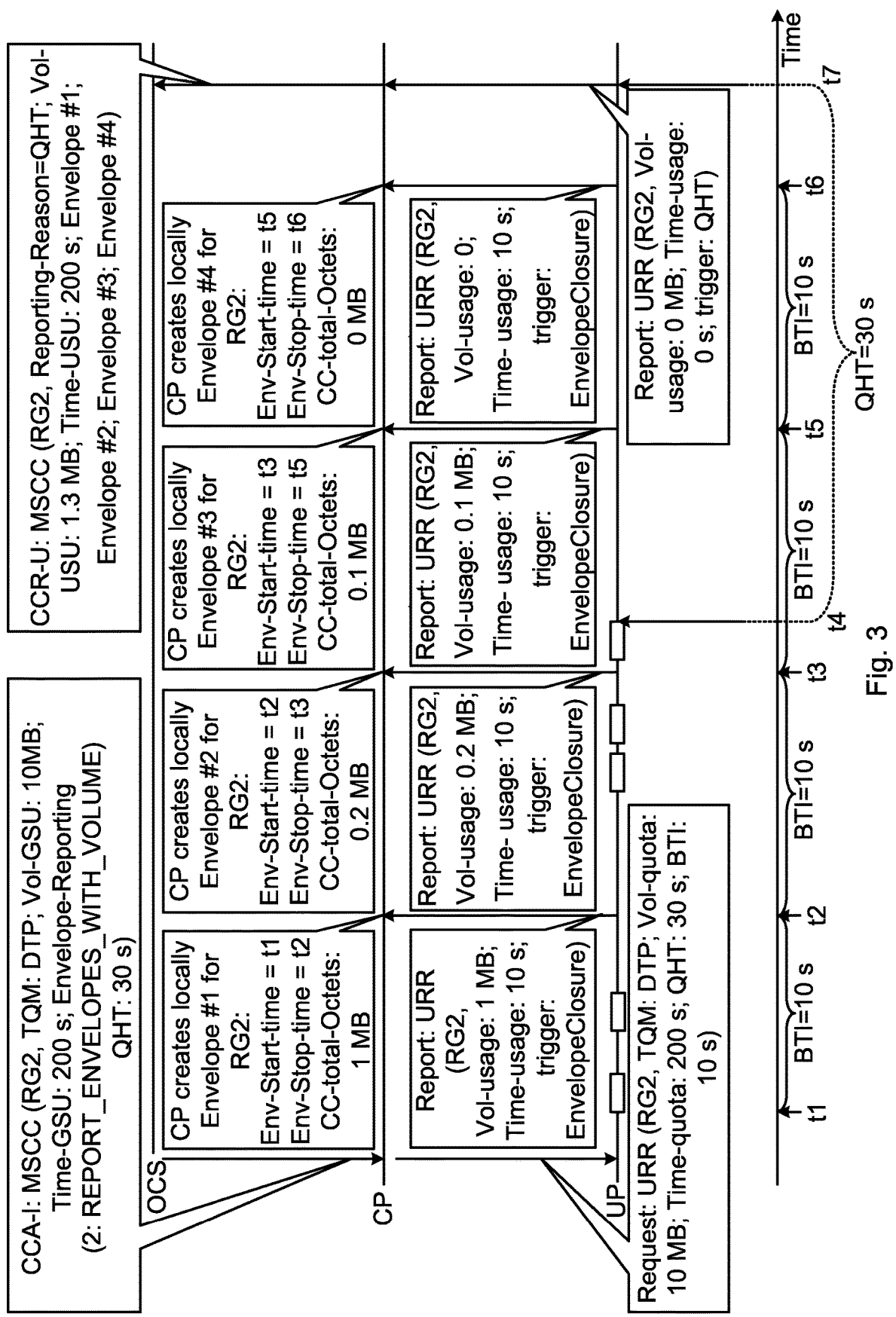
FIG. 3 schematically illustrates envelope reporting for DTP.

FIG. 3 illustrates an example with envelope reporting for DTP.

The OCS sends a request for envelope reporting to the CP function, wherein the request informs of a TQM set to DTP, a volume quota, a time quota, and a quota holding time (QHT) of 30 s.

The CP function in response thereto sets a URR with a TQM comprising an indication of DTP, a BTI of 10 s, a QHT of 30 s, and volume and time quotas. A request with the URR is sent to the UP function.

The UP function in response thereto starts measuring traffic. When the first traffic is detected, an envelope start time is set to t1. After a BTI a usage report is triggered, and the requested volume and time usage are reported, as well as the start time t1 and the end time t2. The usage report also indicates the usage report trigger to be envelope closure.

The CP function receives the usage report and determines the envelope start time and end time, and based on the indication of the trigger being envelope closure creates and stores a first envelope.

The UP function continues to measure traffic. The previous envelope end time t2 is also the new envelope start time t2. After another BTI another usage report is triggered, and again the requested volume and time usage are reported, as well as the envelope start time t2 and end time t3. The usage report also indicates the usage report trigger to be envelope closure.

The CP function correspondingly creates and stores a second envelope.

Also a third and fourth envelope are created and stored in a corresponding way. However, the fourth BTI and corresponding usage report contains no traffic. After the QHT of 30 s at time t7, counted from time t4 after the last data packet was received, a URR is sent with the requested volume and time usage, as well as an indication of the usage report trigger to be QHT.

The CP function receives the usage report and based on the indication of the trigger being QHT creates reports the envelope to the OCS, the report comprising the first to fourth envelope and summarized volume usage.

Figure 4:
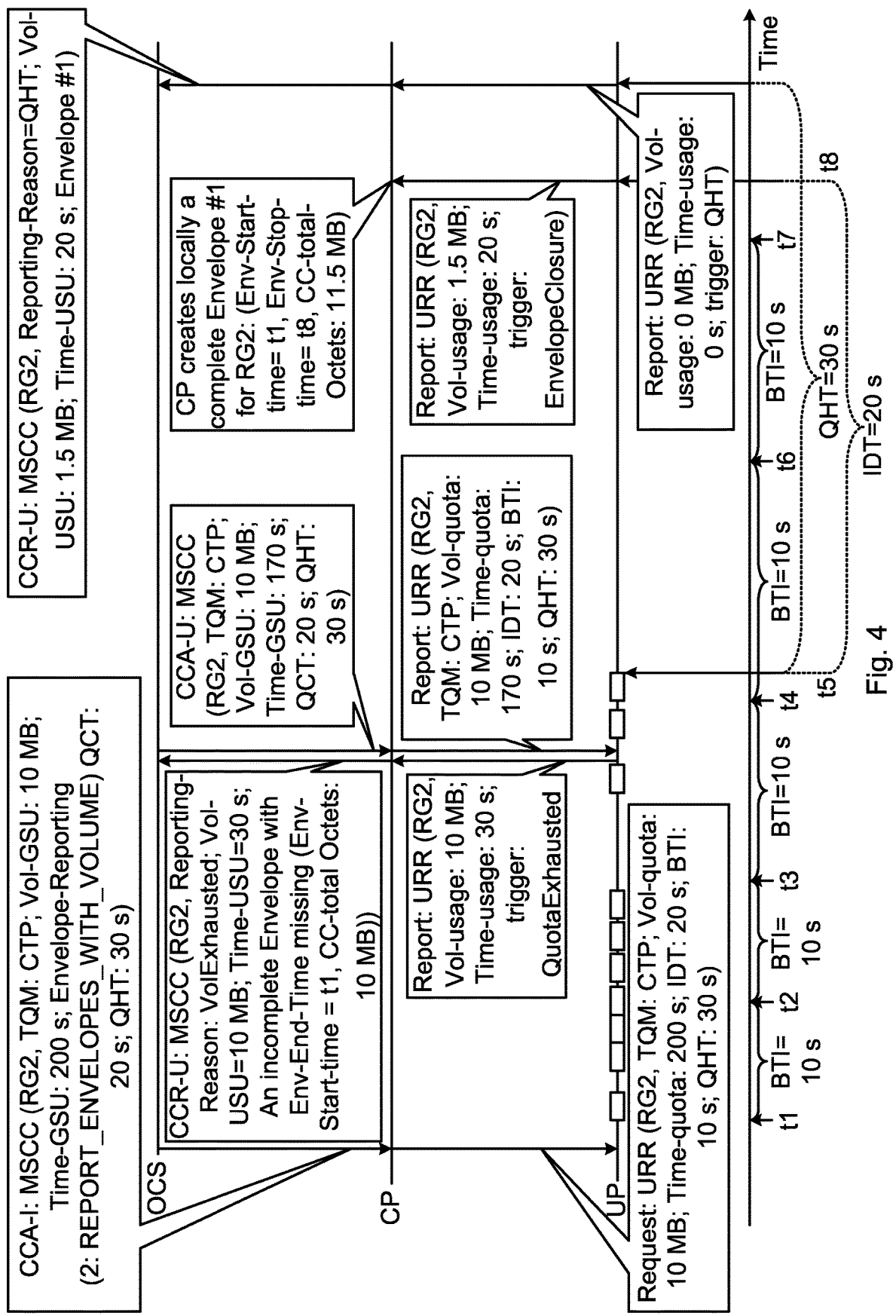
FIG. 4 schematically illustrates envelope reporting for CTP.

FIG. 4 illustrates an example with envelope reporting for CTP.

The OCS sends instruction for envelope reporting to the CP function, wherein the request informs of a TQM set to CTP, a volume quota, a time quota, a QCT of 20 s, and a quota holding time (QHT) of 30 s.

The CP function in response thereto sets a URR with a TQM comprising an indication of CTP, and IDT of 20 s, a BTI of 10 s, a QHT of 30 s, and volume and time quotas. A request with the URR is sent to the UP function.

The UP function in response thereto starts measuring traffic. When the first traffic is detected, an envelope start time is set to t1. After a BTI, at time t2, the UP function continues to measure traffic, until another BTI has expired at time t3.

During the third BTI the volume quota is exhausted, and the UP function sends a usage report, with the start time t1, time and volume usage, and an indication of the trigger being quota exhausted.

The CP function receives the usage report and determines the envelope start time, but an end time is missing and the trigger being quota exhausted instead of envelope closure. The CP function then reports an incomplete envelope with volume and time usage and indicate the report reason to be volume exhaustion.

The OCS in return sends a renewed instruction with volume quota and a remaining time quota to the CP function.

The CP function, in response to the renewed instruction, sends a request with a renewed URR to the UP function.

The UP function, in response to the renewed URR, continues to measure traffic, continuing with the same BTI.

After a time t5 no traffic is measured, and after the IDT has expired at t8, the UP function sends a usage report with volume and time usage since the renewed URR, and also with an indication of envelope closure.

The CP function receives the usage report and determines the envelope start time (for the complete envelope) t1 and end time t8, and based on the indication of the trigger being envelope closure creates and stores a first envelope. The volume usage includes usage for the complete envelope.

However, the fifth BTI contained no traffic, and after the QHT of 30 s, counted from time t5 after the last data packet was received, a URR is sent with the requested volume and time usage being zero, as well as an indication of the usage report trigger to be QHT.

The CP function receives the usage report and based on the indication of the trigger being QHT creates reports the envelope to the OCS, the report comprising the first envelope and summarized volume usage.

The presented solutions provide an efficient mechanism supporting envelope reporting by distributing the complexity of time-based measurement and envelope reporting mechanism among UP and CP. It follows the principle that a URR is merely used to instruct a UP function how to count a packet. It also avoids complicated the UP function implementation with unnecessary information, such as e.g. sending an Envelope Reporting mechanism over the Sx interface.

Figure 5:
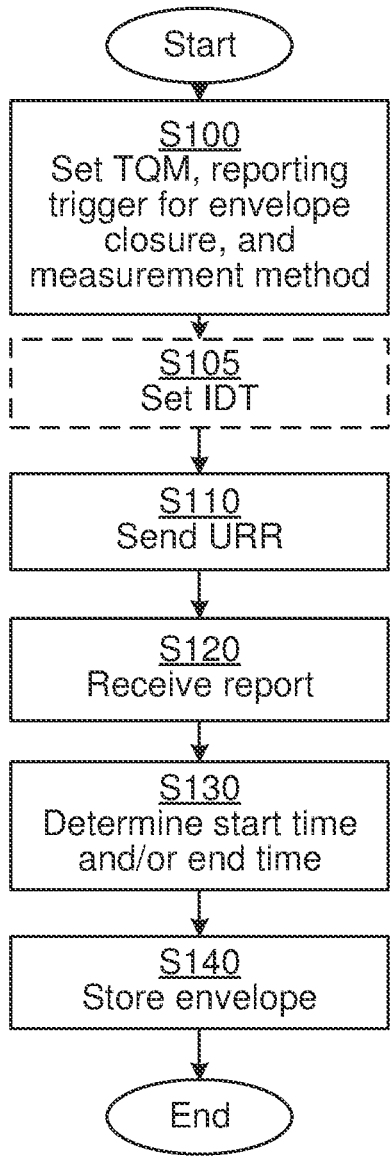
FIG. 5 is a flowchart schematically illustrating an embodiment for a control plane presented herein.

A method, according to an embodiment, for supporting envelope reporting in a radio communication network having a CP function separated from a UP function, is presented with reference to FIG. 5. The method is performed in a CP node of the radio communication network and comprises setting S100 a TQM in a URR, to which its corresponding service data flows, SDFs, are applicable for envelope reporting, setting S100 at least one reporting trigger in the URR, to instruct the UP function to generate a usage report upon closure of an envelope, setting S100 a measurement method in the URR, to instruct the UP function to collect usage of volume, time and/or event, sending S110 the set URR to the UP function, receiving S120 one or more usage reports from the UP function, in response to the sent URR, wherein the received usage report(s) comprises at least a usage report trigger set to envelope closure, determining S130 a starting time and/or an ending time for each envelope, based on the received usage report(s), and storing S140 each envelope, with the determined starting time and/or ending time, for online or offline charging.

The TQM may comprise a base time interval, BTI, and a BTI type being either continuous time period, CTP, or discrete time period, DTP.

The method may further comprise setting S105 an inactivity detection timer, IDT, in the URR, to a quota consumption time, QCT, received from an online charging system, OCS.

The at least one reporting trigger may be set to envelope closure for CTP and/or DTP.

The determining of the envelope starting time may be based on a time of the first packet in each usage report after a received usage report with the usage report trigger being set to envelope closure.

The determining of the envelope ending time may be based on a time when a received usage report with the user report trigger set to envelope closure has been generated.

Figure 6:
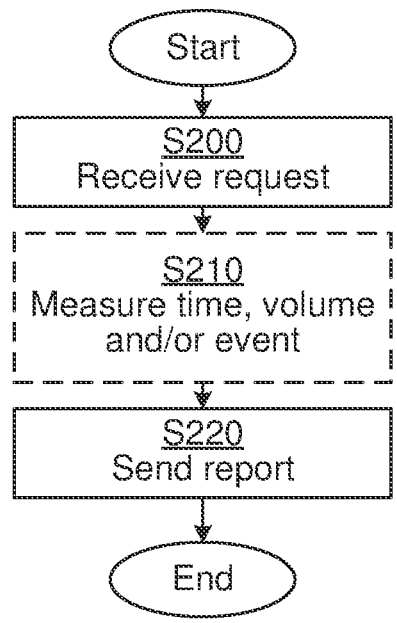
FIG. 6 is a flowchart schematically illustrating an embodiment for a user plane presented herein.

A method, according to an embodiment, for supporting envelope reporting in a radio communication network having a CP function separated from a UP function, is presented with reference to FIG. 6. The method is performed in a UP node of the radio communication network and comprises receiving S200 a URR from the CP function, the URR comprising a TQM and at least one reporting trigger set to envelope closure, and sending S220 a usage report to the CP function, indicating the closure of an envelope.

The TQM may comprise a base time interval, BTI, and a BTI type being either continuous time period, CTP, or discrete time period, DTP.

The received URR may comprise a measurement method and an inactivity detection timer, IDT, and the BTI type being CTP, and wherein the usage report comprises measurement of time, volume and/or event as instructed in the received measurement method, for a period of time containing consecutive BTIs until the IDT has expired or when detecting no usage for a BTI.

The received URR may comprise a measurement method and the BTI type being DTP, and wherein the usage report comprises measurement of time, volume and/or event as instructed by the received measurement method, for each BTI.

The usage report may comprise a usage report trigger set to envelope closure.

A CP node, according to an embodiment, for supporting envelope reporting in a radio communication network having a CP function separated from a UP function, is presented with reference to FIG. 7. The CP node comprises a processor 10 and a computer program product 12, 13 storing instructions that, when executed by the processor, causes the CP node to set S100 a TQM in a URR to which its corresponding service data flows, SDFs, are applicable for envelope reporting, set S100 at least one reporting trigger in the URR, to instruct the UP function to generate a usage report upon closure of an envelope, set S100 a measurement method in the URR, to instruct the UP function to collect usage of volume, time and/or event, send S110 the set URR to the UP function, receive S120 one or more usage reports from the UP function, in response to the sent URR, wherein the received usage report(s) comprises at least a usage report trigger set to envelope closure, determine S130 a starting time and/or an ending time for each envelope, based on the received usage report(s), and store S140 each envelope, with the determined starting time and/or ending time, for online or offline charging.

The TQM may comprise a base time interval, BTI, and a BTI type being either continuous time period, CTP, or discrete time period, DTP.

The CP node may further be caused to set S105 an inactivity detection timer, IDT, in the URR, to a quota consumption time, QCT, received from an online charging system, OCS.

The at least one reporting trigger may be set to envelope closure for CTP and/or DTP.

The determining of the envelope starting time may be based on a time of the first packet in each usage report after a received usage report with the usage report trigger being set to envelope closure.

The determining of the envelope ending time may be based on a time when a received usage report with the user report trigger set to envelope closure has been generated.

FIG. 7 is a schematic diagram showing some components of the CP node. The processor 10 may be provided using any combination of one or more of a suitable central processing unit, CPU, multiprocessor, microcontroller, digital signal processor, DSP, application specific integrated circuit etc., capable of executing software instructions of a computer program 14 stored in a memory. The memory can thus be considered to be or form part of the computer program product 12. The processor 10 may be configured to execute methods described herein with reference to FIG. 5.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processor 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the CP node.

The CP node may further comprise an input/output (I/O) interface 11 including e.g. a user interface. The CP may further comprise a receiver configured to receive signalling from other nodes, and a transmitter configured to transmit signalling to other nodes (not illustrated). Other components of the CP node are omitted in order not to obscure the concepts presented herein.

FIG. 9 is a schematic diagram showing functional blocks of the CP node. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 5, comprising a determination manager unit 90 and a communication manager unit 91. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manager 90 is for supporting envelope reporting. This module corresponds to the determine step S130 of FIG. 5. This module can e.g. be implemented by the processor 10 of FIG. 7, when running the computer program.

The communication manager 91 is for supporting envelope reporting. This module corresponds to the setting steps S100 and S105, the send step S110, the receive step S120, and the store step S140 of FIG. 5. This module can e.g. be implemented by the processor 10 of FIG. 7, when running the computer program.

FIG. 8 is a schematic diagram showing some components of the UP node. The processor 20 may be provided using any combination of one or more of a suitable central processing unit, CPU, multiprocessor, microcontroller, digital signal processor, DSP, application specific integrated circuit etc., capable of executing software instructions of a computer program 24 stored in a memory. The memory can thus be considered to be or form part of the computer program product 22. The processor 20 may be configured to execute methods described herein with reference to FIG. 6.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 23 in the form of a data memory may also be provided, e.g. for reading and/or storing data during execution of software instructions in the processor 20. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 25, to improve functionality for the UP node.

The UP node may further comprise an input/output (I/O) interface 21 including e.g. a user interface. The UP may further comprise a receiver configured to receive signalling from other nodes, and a transmitter configured to transmit signalling to other nodes (not illustrated). Other components of the UP node are omitted in order not to obscure the concepts presented herein.

FIG. 10 is a schematic diagram showing functional blocks of the UP node. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 6, comprising a determination manager unit 100 and a communication manager unit 101. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manager 100 is for supporting envelope reporting in a radio communication network having a control plane, CP, function separated from a UP function. This module corresponds to the measure step S210 of FIG. 6. This module can e.g. be implemented by the processor 20 of FIG. 8, when running the computer program.

The communication manager 101 is for supporting envelope reporting in a radio communication network having a control plane, CP, function separated from a UP function. This module corresponds to the receive step S200 and the send step S220 of FIG. 6. This module can e.g. be implemented by the processor 20 of FIG. 8, when running the computer program.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for supporting envelope reporting, the method being performed by a control plane (CP) function and comprising:
    sending a usage reporting rule (URR) to a user plane (UP) function, wherein the URR sent to the UP function comprises a reporting trigger indicator for instructing the UP function to generate a usage report after detecting a closure of an envelope;
    after the closure of the envelope, receiving a usage report generated by the UP function, wherein the received usage report comprises a usage report trigger indicator indicating that the closure of the envelope triggered the UP function to generate the usage report; and
    storing the envelope with a determined starting time and/or an ending time for offline or online charging.

2. The method of claim 1, further comprising determining the starting time and/or ending time based on the received usage report.

3. The method of claim 1, wherein the URR further comprises a time quota mechanism (TQM) and a measurement method indicator.

4. The method of claim 3, wherein the TQM comprises a base time interval (BTI) and a BTI type being either continuous time period (CTP) or discrete time period (DTP).

5. The method of claim 4, wherein the reporting trigger indicator included in the URR is set to envelope closure for CTP and/or DTP.

6. The method of claim 1, wherein the URR further comprises an inactivity detection timer (IDT) that is set to a quota consumption time (QCT) received from an online charging system (OCS).

7. The method of claim 1, wherein
the method comprises determining the starting time for the envelope based on the received usage report, and
determining the starting time is based on a time of a first packet in each usage report after a received usage report with the usage report trigger being set to envelope closure.

8. The method of claim 1, wherein
the method comprises determining the ending time for the envelope based on the received usage report, and
determining the ending time is based on a time when a received usage report with the user report trigger set to envelope closure has been generated.

9. A non-transitory computer readable medium storing a computer program for causing a control plane function to perform the method of claim 1.

10. A method for supporting envelope reporting in a radio communication network having a control plane (CP) function and a user plane (UP) function, the method being performed by the UP function and comprising:
receiving a usage reporting rule (URR) transmitted by the CP function, the URR comprising a reporting trigger indicator for instructing the UP function to generate a usage report after detecting a closure of an envelope;
after detecting the closure of the envelope, generating the usage report; and
sending the usage report to the CP function, wherein the usage report comprises a usage report trigger indicator indicating that the closure of the envelope triggered the UP function to generate the usage report.

11. The method of claim 10, wherein the URR further comprises a time quota mechanism (TQM).

12. The method of claim 11, wherein the TQM comprises a base time interval (BTI) and a BTI type being either continuous time period (CTP) or discrete time period (DTP).

13. The method of claim 12, wherein the received URR further comprises:
a measurement method and an inactivity detection timer (IDT), and the BTI type being CTP, and wherein the usage report comprises measurement of time, volume and/or event as instructed in the received measurement method, for a period of time containing consecutive BTIs until the IDT has expired or when detecting no usage for a BTI; or
a measurement method and the BTI type being DTP, and wherein the usage report comprises measurement of time, volume and/or event as instructed by the received measurement method, for each BTI.

14. A non-transitory computer readable medium storing a computer program for causing a user plane function to perform the method of claim 10.

15. The method of claim 10, wherein
detecting the closure of the envelope comprises detecting an envelope closure event, and
detecting the envelope closure event comprises:
i) detecting expiration of an inactivity period;
ii) detecting no usage for a Base Time Interval (BTI); or
iii) detecting the end of a Base Time Interval (BTI).

16. The method of claim 10, wherein
detecting the closure of the envelope comprises detecting an envelope closure event, and
detecting the envelope closure event comprises detecting no usage for a Base Time Interval (BTI).

17. A control plane (CP) function for supporting envelope reporting, the CP function comprising:
a processor; and
a computer program product storing instructions that, when executed by the processor, causes the CP function to perform a process comprising:
sending a usage reporting rule (URR) to a user plane (UP) function, wherein the URR sent to the UP function comprises a reporting trigger indicator for instructing the UP function to generate a usage report after detecting a closure of an envelope;
receiving a usage report generated by the UP function after the closure of the envelope, wherein the received usage report comprises a usage report trigger indicator indicating that the closure of the envelope triggered the UP function to generate the usage report; and
storing the envelope with a determined starting time and/or an ending time for offline or online charging.

18. The CP function of claim 17, further comprising further comprising determining the starting time and/or ending time based on the received usage report.

19. The CP function of claim 17, wherein
the URR further comprises a time quota mechanism (TQM) and a measurement method indicator, and
the TQM comprises a base time interval (BTI) and a BTI type being either continuous time period (CTP) or discrete time period (DTP).

20. The CP function of claim 17, wherein the process further includes:
setting an inactivity detection timer (IDT) in the URR to a quota consumption time (QCt) received from an online charging system (OCS).

21. The CP function of claim 17,
the process comprises determining the starting time for the envelope based on the received usage report, and
determining the starting time is based on a time of a first packet in each usage report after a received usage report with the usage report trigger being set to envelope closure.

22. The CP function of claim 17, wherein
the process comprises determining the ending time for the envelope based on the received usage report, and
determining the ending time is based on a time when a received usage report with the user report trigger set to envelope closure has been generated.

23. A user plane (UP) function for supporting envelope reporting in a radio communication network having a control plane (CP) function separated from the UP function, the UP function comprising:
a processor; and
a computer program product storing instructions that, when executed by the processor, causes the UP function to perform a process that comprises:
processing a usage reporting rule (URR) transmitted by the CP function, the URR comprising a reporting trigger indicator for instructing the UP function to generate a usage report after detecting a closure of an envelope;

after detecting the closure of the envelope, generating the usage report; and sending the usage report to the CP function, wherein the usage report comprises a usage report trigger indicator indicating that the closure of the envelope triggered the UP function to generate the usage report.

24. The UP function of claim 23, wherein the URR further comprises a time quota mechanism (TQM), and the TQM comprises a base time interval (BTI) and a BTI type being either continuous time period (CTP) or discrete time period (DTP).

25. The UP function of claim 24, wherein the received URR further comprises:

a measurement method and an inactivity detection timer (IDT) and the BTI type being CTP, and wherein the usage report comprises measurement of time, volume and/or event as instructed in the received measurement method, for a period of time containing consecutive BTIs until the IDT has expired or when detecting no usage for a BTI, or a measurement method and the BTI type being DTP, and wherein the usage report comprises measurement of time, volume and/or event as instructed by the received measurement method, for each BTI.

* * * * *